US007419376B2

(12) United States Patent
Sarvazyan et al.

(10) Patent No.: US 7,419,376 B2
(45) Date of Patent: Sep. 2, 2008

(54) HUMAN TISSUE PHANTOMS AND METHODS FOR MANUFACTURING THEREOF

(75) Inventors: Armen P. Sarvazyan, Lambertville, NJ (US); Vladimir Egorov, Princeton, NJ (US)

(73) Assignee: Artahn Laboratories, Inc., Lambertville, NJ (US)

( * ) Notice: Subject to any disclaimer, the term of this patent is extended or adjusted under 35 U.S.C. 154(b) by 218 days.

(21) Appl. No.: 11/464,238

(22) Filed: Aug. 14, 2006

(65) Prior Publication Data

US 2008/0076099 A1 Mar. 27, 2008

(51) Int. Cl.
*G09B 23/28* (2006.01)

(52) U.S. Cl. ...................................... 434/273; 434/267

(58) Field of Classification Search ................ 434/262, 434/267, 272, 273; 436/8; 623/7, 8
See application file for complete search history.

(56) References Cited

U.S. PATENT DOCUMENTS 4,001,951 A * 1/1977 Fasse ......................... 434/267
4,134,218 A * 1/1979 Adams et al. ............... 434/267
4,277,367 A 7/1981 Madsen
4,493,653 A * 1/1985 Robbins et al. ............. 434/262
4,655,716 A * 4/1987 Hoevel ....................... 434/267
4,729,892 A * 3/1988 Beall .......................... 424/9.3
4,737,109 A * 4/1988 Abramson .................. 434/267
4,867,686 A * 9/1989 Goldstein ................... 434/267
5,053,341 A * 10/1991 Companion .................... 436/8
5,061,187 A * 10/1991 Jerath ......................... 434/262
5,273,435 A 12/1993 Jacobson
5,805,665 A 9/1998 Nelson
5,902,748 A 5/1999 Madsen
6,099,565 A * 8/2000 Sakura, Jr. ..................... 623/8
6,474,993 B1 * 11/2002 Grund et al. ................ 434/262
6,635,486 B2 * 10/2003 Madsen et al. ................. 436/8
6,669,483 B1 * 12/2003 Leight et al. ................ 434/262
6,675,035 B1 1/2004 Grable
6,793,497 B2 * 9/2004 Herman et al. .............. 434/278
6,817,865 B2 * 11/2004 Charbonneau .............. 434/273
6,854,976 B1 * 2/2005 Suhr .......................... 434/273
6,945,783 B2 9/2005 Weissman
2003/0073061 A1 * 4/2003 Toomey ...................... 434/273

* cited by examiner

*Primary Examiner*—Kurt Fernstrom
(74) *Attorney, Agent, or Firm*—Boris Leschinsky

(57) ABSTRACT

Disclosed are human tissue phantoms mimicking the mechanical properties of real tissue, and methods for manufacturing thereof including the steps of obtaining a computer aided three-dimensional design of a phantom mimicking the tissue in shape and size; fabrication of a mold form facilitating the production of the designed phantom; molding said phantom with the use of two-component silicon gels as a bulk tissue-mimicking material having Young's modulus in the range of 2 to 30 kPa; filling the enclosed volume of said phantom with anatomical and pathological tissue structures mimicking their respective mechanical properties and having Young's modulus in the range of about 30 to 600 kPa; covering said phantom by a protective layer having mechanical properties to a human tissue protective layer; and securing the phantom perimeter on a supporting plate by a rubber barrier. The example of used tissue-mimicking material is a two-component silicone SEMICOSIL gel with variable elastic properties and Young's modulus from 3 kPa to 600 kPa as a result of changing the silicon component ratio. As examples, the breast and prostate phantom tissue and their fabrication procedures are described.

8 Claims, 6 Drawing Sheets

33 34 35 36 37 38 39 40 41 20

HUMAN TISSUE PHANTOMS AND METHODS FOR MANUFACTURING THEREOF

BACKGROUND OF THE INVENTION

This invention generally pertains to the field of materials which closely mimic the mechanical characteristics of human tissue and organs, such as breast and prostate. More specifically, these materials can be used advantageously in manufacturing of tissue models, which are beneficial for training clinical practitioners to conduct palpatory examination as well as for testing and calibrating elasticity imaging devices.

Human tissue phantoms, in general, are used as tools for the assessment and verification of performance standards in the daily clinical practice of diagnostic radiology and ultrasonic equipment.

The U.S. Pat. No. 5,805,665 discloses an apparatus and a method of use and construction of anthropomorphic mammography phantoms, which provide mammography practitioners with a training tool to practice proper patient breast positioning and optimal patient X-ray exposure. The mammography phantoms simulate normal breast tissue as well as tissue irregularities and anomalies associated with various known breast pathologies. Examples of such pathologies include microcalcifications, cysts, tumors, etc. The mammography phantoms preferably conform to the shape of the upper torso of a female, complete with one or two breast simulators that can vary in size, density, compressibility, and stretchability.

One example of a phantom for the use in training of practitioners to locate and aspirate tumors identified by X-ray consists of a bulk of tissue-equivalent, X-ray permeable material containing at least one simulated tumor as described in U.S. Pat. No. 5,273,435. A phantom can be fabricated from an X-ray permeable material (such as gelatin with a radiopaque material like iodinated oil containing lampblack) poured into a mold with the shape of a human breast.

Another example is an ultrasound phantom containing tissue-mimicking material and disclosed in U.S. Pat. No. 4,277,367, in which both the speed and attenuation of sound could be simultaneously adjusted using water based gels like those derived from animal hides. In one embodiment, ultrasound phantoms with desired ultrasonic properties are prepared from a mixture of gelatin, water, n-propanol, and graphite powder—all mixed with a preservative. In another embodiment, an oil and gelatin mixture forms the basis of the tissue-mimicking material.

A tissue-mimicking material for use in ultrasound applications possessing the ultrasonic speed and attenuation characteristics of human tissue is described in U.S. Pat. No. 5,902,748. This material includes a pure gel-forming component and hydroxy compound, such as an n-propanol, to adjust the ultrasonic speed of propagation through the material. The tissue-mimicking material may be included in an ultrasound phantom container with solid scattering particles and/or test objects incorporated therein.

A breast-shaped phantom for optical and magnetic resonance imaging quality control is known from U.S. Pat. No. 6,675,035. This phantom consists of a cup in the shape of a human breast in its natural pendant position and a filler (agar, fat emulsion) occupying the volume of the cup. The cup forms an outer skin (polyurethane) of the phantom with a thickness similar to human skin and with optical transparency at selected optical wavelengths similar to human skin. The filler material has optical scattering and absorption characteristics similar to human breast tissue.

An interactive breast examination training system to familiarize physicians and other medical personnel with the techniques for clinical breast examinations is described in U.S. Pat. No. 6,945,783. The system includes a model with an outer shape comparable to a human breast. Inflatable nodules are embedded at various locations and depths in the model. The nodules are adapted by being inflated to simulate tumors and are relatively undetectable by touch when deflated. Pressure sensors are fluidly coupled to the nodules to sense fluid pressure in the nodules. A pump is fluidly coupled to the nodules to inflate the nodules. A processor is operatively coupled to the pressure sensors and the pump to inflate the nodules to desired hardness levels based upon pressure readings from the pressure sensors.

It is clear that tissue-mimicking materials must exhibit the same properties relevant to a particular imaging modality as those of actual human soft tissues. For elasticity imaging, tissue-mimicking materials for use in phantoms should have mechanical properties that correspond to those of real tissue. Soft tissues have Young's modulus values ranging from about 2 kPa for normal tissue to about 1,000 kPa for pathological anomalies such as cancer. Tissue-mimicking materials for use in magnetic resonance imaging phantoms should have values of characteristic relaxation times, T1 and T2, which correspond to those of tissue. Soft tissues exhibit T1 values ranging from about 200-1200 ms and T2 values from about 40-200 ms. The tissue-mimicking material for use in ultrasound should have the same range of speeds of sound, attenuation coefficients, and backscatter coefficients as soft tissue. These parameters should be controllable in the manufacturing process of the phantom material, and their variation within the range of room temperatures should be small. Speeds of sound in human soft tissues vary over a fairly small range with an average value of about 1540 m/s. The speed of sound in fat is thought to be about 1470 m/s. The amplitude attenuation coefficients in these tissues appear to vary over the range from about 0.4 dB/cm to about 2 dB/cm at a frequency of 1 MHz. For use in computed tomography (CT), the tissue-mimicking materials must exhibit the same CT number as that of the tissue being mimicked. The CT numbers for most soft tissues lie in the range of about 20-70 at the typical effective X-ray energy of a clinical CT scanner, except for fat where the CT number is about 100. Although known tissue phantoms accurately mimic ultrasonic, X-ray, optical and MRI related parameters within the range characteristic for tissues in vivo, there are no tissue phantoms accurately representing entire range of the elasticity modulus for normal and diseased tissue.

There is a need for phantoms that emulate the real mechanical characteristics of human tissue, (such as the breast and prostate as examples) that resemble an organ in shape and size appropriate for use in training clinical practitioners conducting manual palpation.

There is also a need for phantoms with predetermined elasticity properties representative of the entire range of normal and pathological tissue for calibrating and testing elasticity imaging devices.

SUMMARY OF THE INVENTION

It is an object of the present invention to provide materials for tissue phantoms that accurately emulates the mechanical properties of tissues of human organs, such as the breast and prostate.

It is another object of the present invention to provide phantoms of human organs with realistic mechanical properties, phantoms that resemble the organs in shape and size and that could be used in training medical practitioners in clinical breast examination, digital rectal examination, etc.

It is another object of the present invention to provide a phantom that can be used for testing and calibrating elasticity imaging devices, and, more particularly, to quantitatively determine the effectiveness of these devices in assessment of lesions of various sizes, hardness, and depths.

It is yet another object of the present invention to provide an organ phantom that can be fabricated by common manufacturing techniques.

It is yet another object of the present invention to provide an organ phantom whose mechanical characteristics will not change over time.

It is yet a further object of the present invention to provide a phantom, which can be used to test and/or improve a clinician's ability to detect tissue irregularities by manual palpation.

The present invention provides phantoms for training practitioners conducting palpatory examination and for testing and calibrating devices for elasticity imaging. The simulated bulk tissue material, with Young's modulus in the range from about 2 kPa to about 30 kPa, is a two-component silicon with variable elastic properties resulting from changing the silicon component ratio. Simulated pathological structures are molded separately using a rubber-like material with known physical properties, with Young's modulus in the range from 30 kPa to 1000 kPa. The organ's protective surface layer includes thin nylon bucktram and a rubber stratum to add mechanical stability to the phantom.

The present invention also provides a method for manufacturing phantoms, complete with the steps of creating a molding form of an organ phantom resembling a shape of a real organ; filling the phantom inner volume with simulated inner tissue structures such as ducts, fat tissue, lymph nodes, muscles and bones; filling the phantom inner volume with simulated commonly occurring pathological structures such as adenocarcinoma, cyst, fibroadenoma, and infiltrating scirrhus carcinoma; and covering the phantom with a protective layer mimicking the human skin.

Other objects and features of the present invention will become apparent from consideration of the following description in conjunction with the accompanying drawings.

BRIEF DESCRIPTION OF THE DRAWINGS

A more complete appreciation of the subject matter of the present invention and the various advantages thereof can be realized by reference to the following detailed description and accompanying drawings, in which.

DETAILED DESCRIPTION OF THE PREFERRED EMBODIMENTS

A detailed description of the present invention follows with reference to the accompanying drawings, in which like elements are indicated by like reference letters and numerals.

Figure 1A:
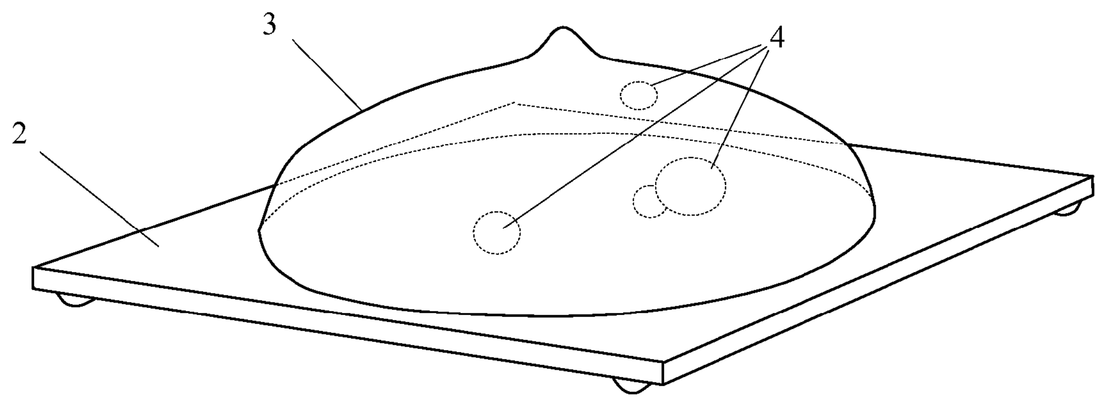
FIG. 1A is a perspective view of a preferred embodiment of a breast phantom.

FIG. 1A is a perspective view of a first preferred embodiment of the invention, namely a breast phantom placed on a flat plate 2. The phantom includes a simulated skin layer 3 having mechanical properties similar to that of human skin and incorporated therein structures 4 mimicking lesions with increased hardness as compared to the hardness of the simulated bulk tissue of the phantom. Two-component SEMICOSIL silicon gels (manufactured by Wacker Silicon Corp.) can be used as the phantom filler to create the simulated bulk tissue as well as a material mimicking inner anatomical and pathological structures. These gels meet all basic requirements for materials of tissue-mimicking phantoms: they provide an adequate range of Young's modulus (E), reasonable shelf-life, and are nontoxic and stable.

To manufacture a phantom, the bulk tissue part of the phantom is poured into a mold form. Then, various anatomical and pathological structures are added. The entire phantom is then cured in the form. It is then extracted from the mold form upon solidification and placed on a flat rectangular support plate 2 as shown in FIG. 1A. Then, the phantom is covered by several sub-millimeter layers of elastic material to mimic the external protective surface such as skin and provide mechanical protection. Preferably, the phantom is covered by nylon fabric/bucktram with thickness of about 0.2 mm and then poured over by SEMICOSIL and inserted back in the mold form with additional SEMICOSIL to smooth the surface. The nylon fabric plays a key role in the mechanical protection against surface breakup, along with good surface elongation without hysteresis. Finally, the phantom is covered by a transparent layer of SEMICOSIL 960, having a thickness of about 0.3 mm. Appropriate for room temperature vulcanizing, amine cure silicone rubber dispersion is then used for additional mechanical protection against surface adhesion. It cures on contact with moisture from the ambient air. Another viable option for additional mechanical protection of the phantom surface is ELASTOSIL C 150, a two-component composite silicone, which can be sprayed on the phantom surface by a pneumatic gun.

Figure 1B:
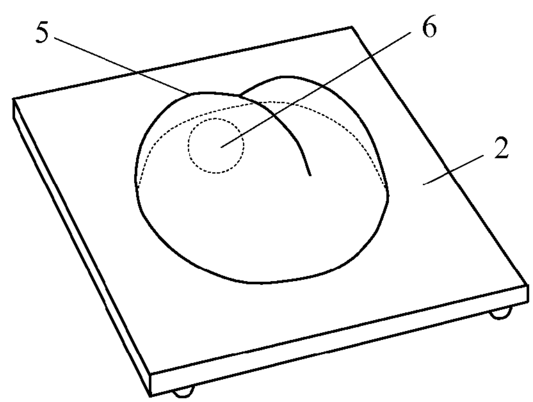
FIG. 1B is a perspective view of a preferred embodiment of a prostate phantom.

FIG. 1B is a perspective view of a second preferred embodiment of the invention, namely a prostate phantom placed on the flat plate 2. The phantom is covered by a surface protective layer 5 having mechanical properties similar to that of a human prostate with an incorporated nodule 6 mimicking a cancer-like pathological structure having increased hardness relative to the basic bulk tissue of the urethra. Again, two-component SEMICOSIL silicon gels can be used as the phantom filler to make a urethra bulk tissue as well as (in a different component ratio) a material for mimicking pathological structures. These gels meet all basic requirements for materials used in tissue-mimicking phantoms: they provide an adequate range of Young's modulus (E), reasonable shelf-life, and are nontoxic and stable. Preferably, the prostate phantom is covered by a layer of SEMICOSIL 960, having thickness of about 0.3 mm, or by a thin layer of ELASTOSIL C 150.

Computer aided design of a human organ, provided by AutoCAD or SolidWork software, for example, allows fast and accurate fabrication of a custom mold form with a large variety of phantom shapes, sizes, and a flexible choice of materials for rapid prototyping.

Figure 2A:
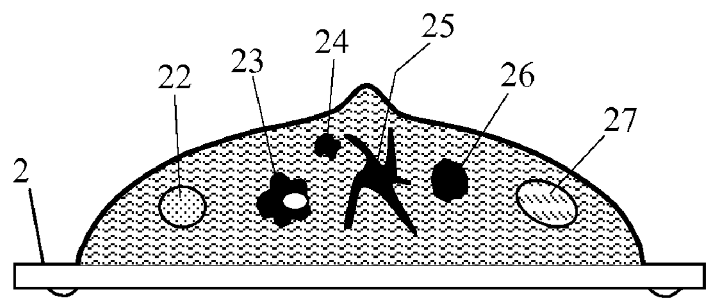
FIG. 2A is a cross-sectional view of a breast phantom of the present invention with incorporated simulated pathological structures.

FIG. 2A is a cross-sectional view of a breast phantom with imbedded simulated pathological structure set manufactured in accordance with the present invention. This structure set can include various pathological formations such as those mimicking cysts 22, medullary carcinoma 23, ductal carcinoma 24, infiltrating scirrhus carcinoma 25, lobular carcinoma 26, and fibroadenoma 27. All these structures are molded separately using two-component silicones with Young's modulus ranging from 30 kPa to 600 kPa. Each breast phantom can include up to 10 specifically or randomly placed lesions in a size range of about 4 to 40 mm.

Figure 2B:
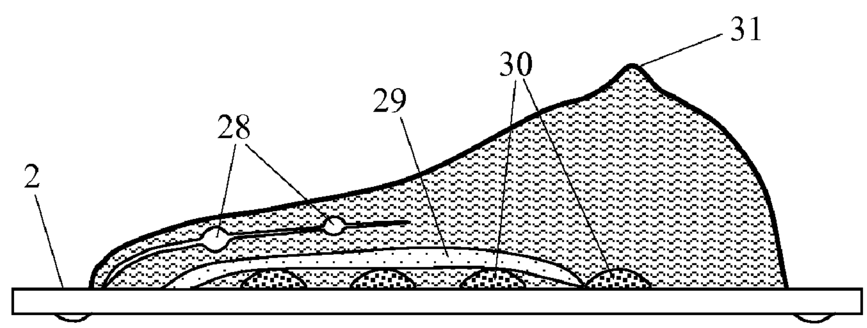
FIG. 2B is a cross-sectional view of a breast phantom of the present invention with incorporated simulated anatomical structures.

FIG. 2B is a cross-sectional view of a breast phantom with incorporated simulated anatomical structures made in accordance with the present invention. Elements of this structure set are imbedded at their respective anatomically appropriate locations. This structure set can include molded anatomical structures mimicking lymph nodes 28, pectoralis major muscle 29, ribs 30, and nipple 31 with areola. These structures are also molded separately and can have Young's modulus beyond 1,000 kPa (ribs). The breast phantom of the invention can include any desired combination of anatomical and pathological structures.

Figure 2C:
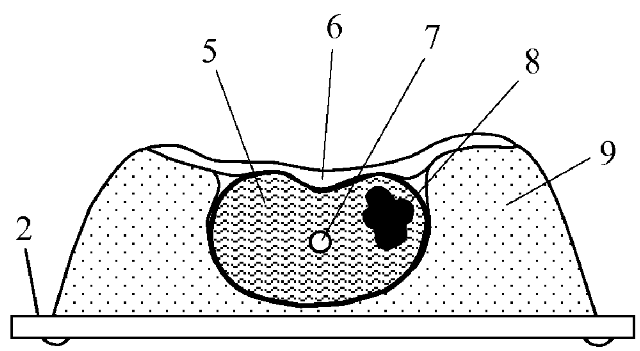
FIG. 2C is a cross-sectional transverse view of a prostate phantom with surrounding tissue and a nodule incorporated therein.

FIG. 2C is a cross-sectional view of a prostate phantom 5 with surrounding tissue 9 and incorporated simulated pathological structure 8, all made in accordance with the present invention. The prostate phantom 5 is covered by a layer 6 mimicking a rectal wall. The prostate phantom can include simulated urethra 9 and seminal vesicles having different elasticity properties. The physiological structures of differing elasticity properties are molded separately from two-component silicones with Young's modulus ranging from 10 kPa to 100 kPa. The pathological structure set includes molded formations such as a single nodule or multiple nodules, such nodules being separated from each other or associated together for anatomically proper mimicking of prostate cancer. These structures are molded separately using two-component silicones with Young's modulus ranging from 50 kPa to 600 kPa.

Figure 3:
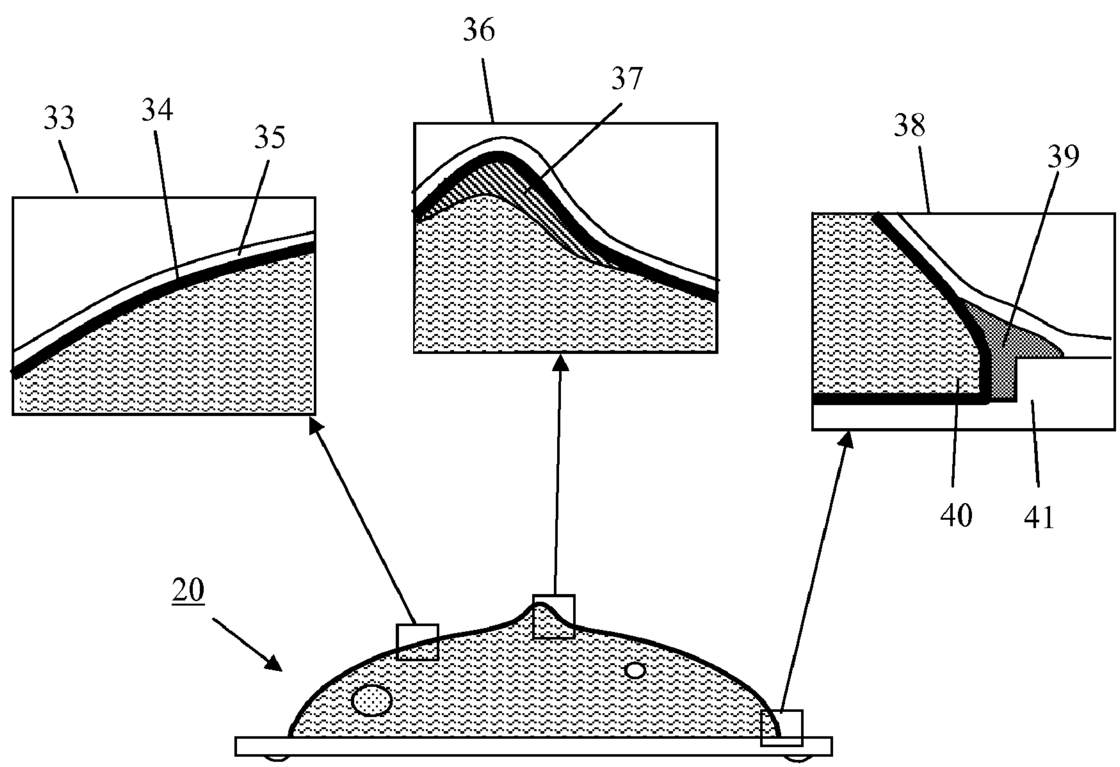
FIG. 3 is a cross-sectional view of a breast phantom illustrating the structure and technological details of the present invention.

FIG. 3 is a cross-sectional view of a breast tissue phantom illustrating the structure and technological details of the present invention. Panel 33 shows a cross-section of the surface layers covering breast tissue phantom to provide mechanical protection similar to human skin. The protective skin layer includes thin nylon bucktram 34 used for mechanical stability of the breast phantom and surface rubber stratum 35 used for surface protection of the phantom from a lubricant used during examination to eliminate clamminess on the surface. Panel 36 shows a cross-section of the nipple with an underlying local formation 37 mimicking mechanical properties of a breast areola. Panel 38 shows a cross-section of the phantom perimeter explaining how the perimeter can be secured by a rubber protective barrier 39 binding the phantom perimeter to a base 41.

Figure 4:
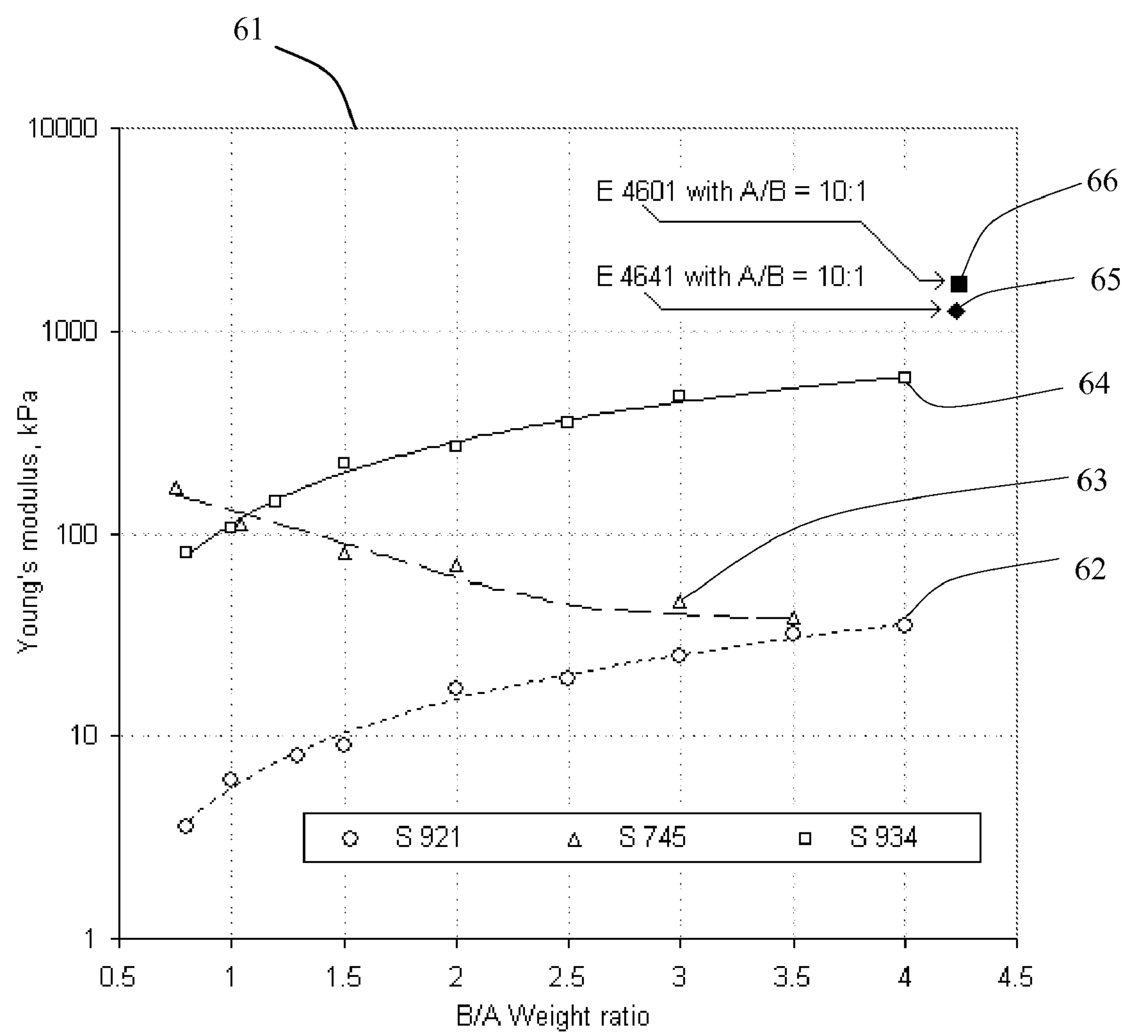
FIG. 4 is an elasticity assessment of two-component SEMICOSIL silicones used in the phantom manufacturing method in accordance with the present invention.

FIG. 4 is an elasticity assessment graph 61 of two-component SEMICOSIL silicones used in the phantom manufacturing method in accordance with the present invention. Specifically, the bulk breast tissue is mimicked by two-component silicon SEMICOSIL 921 with a component ratio (B/A) in the range 0.7-1.0 with a corresponding range of Young's modulus E being about 3 to 7 kPa. The full range of the Young's modulus for SEMICOSIL 921 equals to about 3 to 35 kPa as demonstrated by data set 62 in graph 61. To produce composite organ phantoms, a variety of structural inclusions mimicking physiological and pathological formations can be fabricated in separate molds and placed inside a mold assembly before it is filled up by the bulk filler. Vacuum cast can be used to avoid air bubbles created as a result of silicone component mixing inside the tissue phantom mold form. Inclusions of various shapes (shown in FIGS. 2A, 2B, 2C as round, oval, lobular, and irregular-shaped items) can be fabricated from SEMICOSIL 745 and SEMICOSIL 934 silicones. By changing the component ratio (B/A) of SEMICOSIL 745 from 3.5 to 0.75, a range of Young's modulus variation of about 38 to 170 kPa can be achieved as shown by data set 63 on graph 61. The component ratio (B/A) of SEMICOSIL 934 from about 0.8 to 4.0 corresponds to Young's modulus variation from about 80 kPa to about 600 kPa as shown by data set 64. Nontransparent silicone, including nude-colored inorganic pigment, may be mixed with SEMICOSILS to add natural visual color to fabricated phantoms. Typically, SEMICOSIL cures fully in 24 hours at room temperature (25° C.) and in 1 hour at 100° C. To extend the Young's modulus range up to 1,000 kPa and higher, silicone rubbers of the type similar to ELASTOSIL are considered as suitable materials. For example, ELASTOSIL M4601 is a two-component, pourable, addition-curing high strength silicone having E of about 1.7 MPa, as shown by a square 66 on FIG. 4. It can be vulcanized at room temperature. ELASTOSIL M4641 has E of about 1.25 MPa, as shown by diamond 65 in graph 61. Silicon curing may be inhibited by sulfur containing materials, plasticizers, urethanes, amine-containing materials, and organometallic compounds, especially organotin compounds. Materials containing these listed components are therefore not recommended in mold production for the described phantom.

An elasticity range of about 2 to 1,000 kPa can also be achieved by a combination of other room temperature vulcanizing two-component silicone gels. For example, a silicone set of RTV6166, RTV 6186, and RTV 6196 (GE Advance Materials) can cover this range as well as materials mentioned above.

Figure 5:
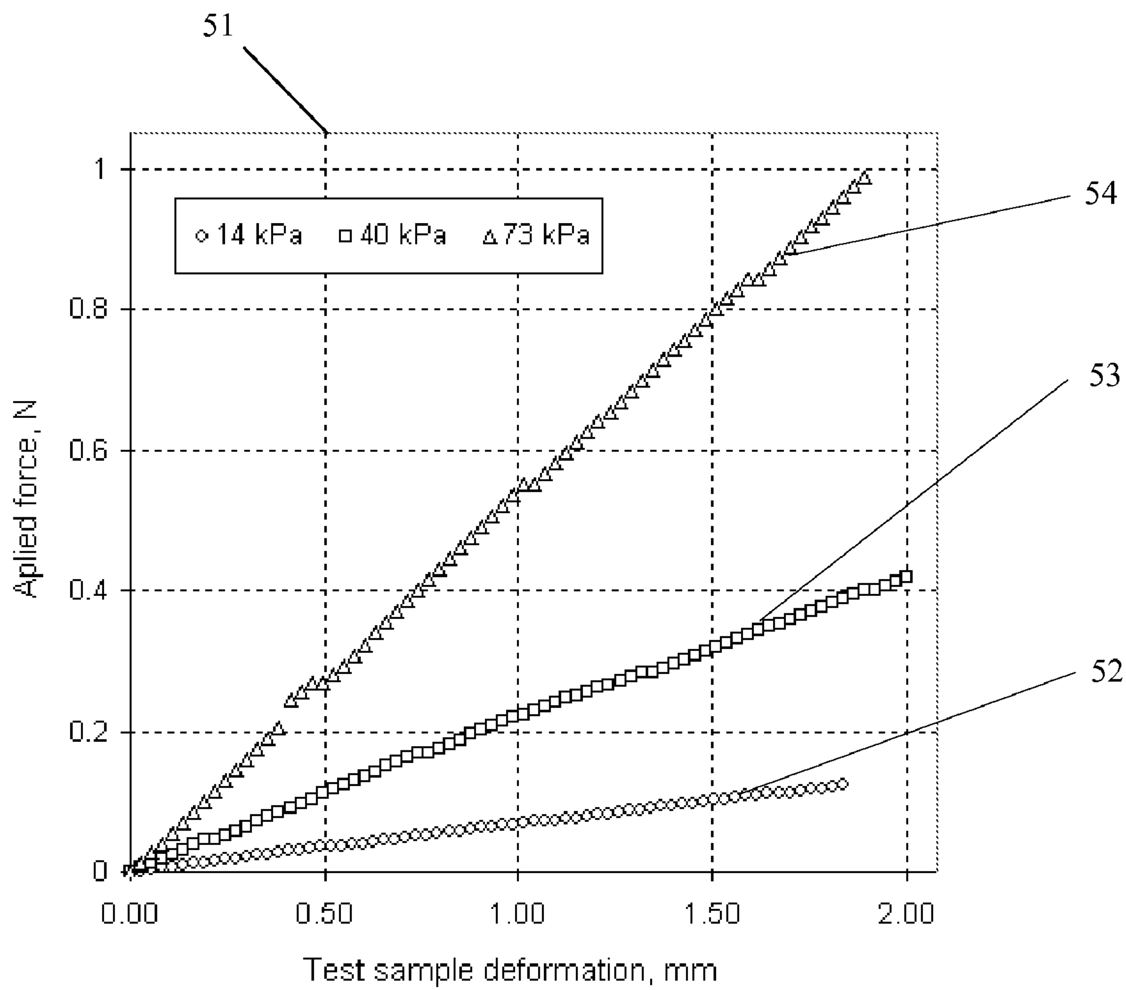
FIG. 5 shows examples of strain-stress curves for phantom pathological structures before incorporation into an organ phantom.

During phantom manicuring, it is important to ensure that the selected silicone or rubber compound has the expected elasticity properties. FIG. 5 shows examples of the loading curves 52, 53, 54 for materials used in phantom production. These curves had been generated by an elasticity measuring device to verify the appropriate elasticity of the manufactured phantoms. Young's modulus calculations are based on a mathematical model describing the strain-stress dependence for the indenter being inserted into the sample. Maximum sample deformation is selected at 15%. Young's modulus of the tested compound may be estimated by direct sample elongation measurements under applied load with the use of a one-dimensional model or generalized Hooke's law for homogenous isotropic bodies.

Figure 6:
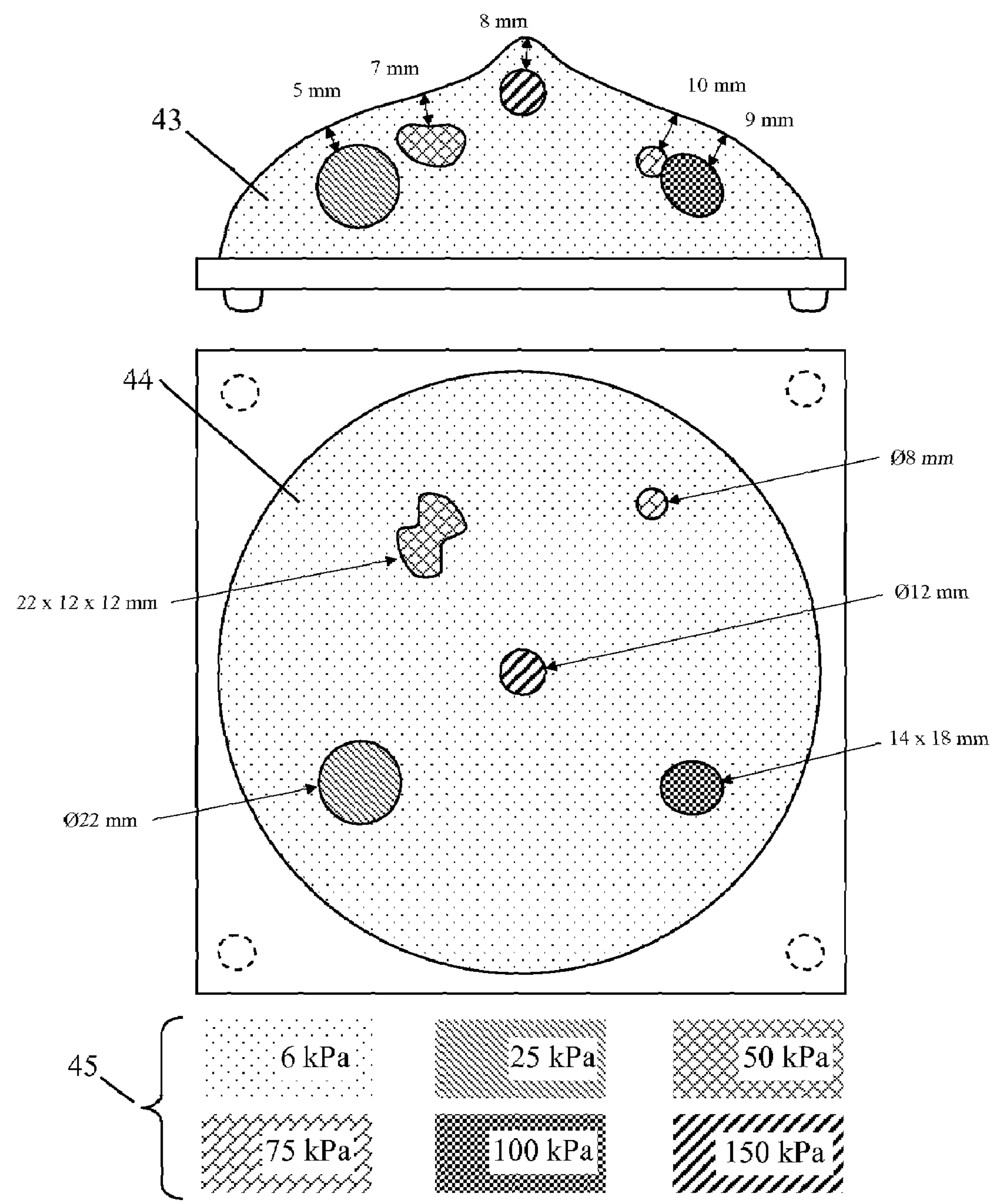
FIG. 6 is an example of a phantom map of Young's modulus distribution inside a manufactured phantom.

After an organ phantom has been fabricated, a phantom map of elasticity distribution inside the phantom is composed. FIG. 6 is an example of a phantom map of Young's modulus distribution inside a manufactured breast phantom. This map includes two projections of the phantom: a side projection 43 and an overhead projection 44. Elasticity decoding patterns 45 are integral parts of this map. Additional graph and text information characterizing mechanical or other features of the fabricated phantom can be included into the phantom map.

Elasticity imaging or elastography requires durable organ phantoms with predetermined mechanical properties to verify computer-simulated models for direct and inverse problem solutions and to validate an apparatus employing a specific technique for recording tissue strain patterns under dynamic stress. Tissue strain data can be obtained with the help of X-ray, magnetic resonance imaging (MRI), as well as optical and ultrasound imaging. An appropriate organ phantom should be manufactured as described above incorporating specific contrast-enhancing additives that provide for a distinctive contrast of imbedded pathological structures in comparison with simulated bulk tissue. Such additives are selected depending on the particular imaging modality used for evaluating tissue phantom as described below.

For X-ray imaging modality, such contrast-enhancing additive is a dry powder mixed with certain chemicals. It can be used for X-ray evaluations to allow adjusting the X-ray opacity of selected structures. Suitable materials for such powder are flour with added salt having increased electron density.

For MRI, the contrast-enhancing additive should mimic the proton density and relaxation times in a physiologically appropriate range to reveal the contrast of the entire simulated pathological structure set imbedded into the organ phantom. Appropriate contrast-enhansing materials for increasing MRI contrast are paramagnetic salts and chelating agent EDTA (ethylene-diaminetetraacetic acid).

For optical observations, a set of luminescent and pigment dyes can be used to differentiate structures with different elasticity properties.

For ultrasound, the simulated pathological structure set should have the range of speeds of sound, attenuation coefficients, and backscatter coefficients as real human soft tissue. In manufactured phantoms, these values can be corrected by adding sugar powder and milled bank sand.

While the invention has been described with reference to the specific embodiments, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A breast tissue phantom comprising:

a simulated bulk breast tissue made from a two-component silicone gel having a Young's modulus ranging from about 2 kPa to about 35 kPa, said simulated bulk tissue having a size and shape of a human breast tissue, a simulated pathological structure set imbedded within said simulated bulk breast tissue, said simulated pathological structure set including at least one simulated pathological formation made from a two-component silicone gel with Young's modulus ranging from about 30 kPa to about 600 kPa, a simulated anatomical structure set imbedded within said simulated bulk breast tissue at anatomically appropriate locations, a simulated skin layer covering said simulated bulk tissue, said skin layer including a nylon fabric covered by a transparent layer of a two-component silicone.

2. The breast tissue phantom as in claim 1, wherein said simulated bulk tissue is made from a SEMICOSIL 921 silicone gel with a B/A component ratio ranging from about 0.7 to about 1, whereby the Young's modulus of said simulated bulk tissue is ranging from about 3 kPa to about 7 kPa.

3. The breast tissue phantom as in claim 1 further including a rubber protective barrier located about a perimeter of said phantom.

4. The breast tissue phantom as in claim 1, wherein said simulated pathological structure set includes a plurality of simulated pathological formations to simulate pathology selected from a group consisting of a cyst, a medullary carcinoma, a ductal carcinoma, an infiltrating scirrhus carcinoma, a lobular carcinoma, and a fibroadenoma.

5. The breast tissue phantom as in claim 1, wherein said simulated anatomical structure including at least one compressible element simulating a tissue selected from a group consisting of a lymph nodes, a pectoralis muscle, a rib, and a nipple.

6. The breast tissue phantom as in claim 1, wherein said simulated pathological and anatomical structures are made from a two-component silicone gel, said gel selected from a group consisting of SEMICOSIL 745 gel and SEMICOSIL 934 gel.

7. The breast tissue phantom as in claim 1, wherein said transparent layer of said simulated skin layer is made of a two-component silicone gel, said gel selected from a group consisting of SEMICOSIL 960 gel and ELASTOSIL C 150 gel.

8. The breast tissue as in claim 7, wherein said simulated skin layer further comprising a rubber stratum.

* * * * *